United States Patent [19]

Datta et al.

[11] Patent Number: 5,012,155
[45] Date of Patent: Apr. 30, 1991

[54] SURFACE TREATMENT OF PHOSPHOR PARTICLES AND METHOD FOR A CRT SCREEN

[75] Inventors: Pabitra Datta, Cranbury; Ronald N. Friel, Hamilton Square, both of N.J.; Robert P. Thompson, Millersville, Pa.

[73] Assignee: RCA Licensing Corp., Princeton, N.J.

[21] Appl. No.: 455,069

[22] Filed: Dec. 22, 1989

Related U.S. Application Data

[62] Division of Ser. No. 287,358, Dec. 21, 1988.

[51] Int. Cl.$^5$ .................. H01J 29/10; H01J 29/28
[52] U.S. Cl. .................. 313/461; 313/466; 313/468
[58] Field of Search .................. 313/461, 466, 468

[56] References Cited

U.S. PATENT DOCUMENTS

| | | | |
|---|---|---|---|
| Re. 30,015 | 5/1979 | Lipp | 313/470 |
| 2,625,734 | 1/1953 | Law | 29/25.13 |
| 3,275,466 | 9/1966 | Kell | 117/33.5 |
| 3,475,169 | 10/1969 | Lange | 96/1 |
| 3,489,556 | 1/1970 | Drozd | 96/1 |
| 3,489,557 | 1/1970 | Lange et al. | 96/1 |
| 4,049,845 | 9/1977 | Lozier et al. | 427/68 |
| 4,737,434 | 4/1988 | Gruber et al. | 430/120 |
| 4,741,984 | 5/1988 | Iami et al. | 430/106.6 |

*Primary Examiner*—Sandra L. O'Shea
*Attorney, Agent, or Firm*—Joseph S. Tripoli; Dennis H. Irlbeck; Vincent J. Coughlin, Jr.

[57] ABSTRACT

The method of surface-treating dry-powdered phosphor particles for use in manufacturing a viewing screen for a CRT to control the triboelectric charge characteristics of the phosphor particles includes the steps of dissolving a suitable quantity of a polymeric coupling agent in a suitable solvent to form a mixture, surface-treating the phosphor particles by adding them to the mixture to provide a coating of the coupling agent thereon, and then drying the surface-treated phosphor particles. The resultant dry-powdered surface-treated phosphor particles are used to make a luminescent viewing screen for a CRT. The coupling agent controls the triboelectric charge characteristics of the phosphor particles during the electrophotographic manufacturing of the screen.

6 Claims, 2 Drawing Sheets

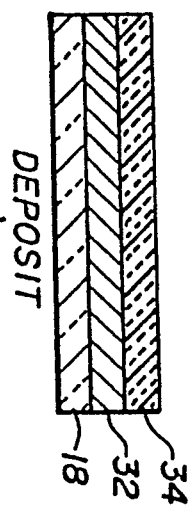
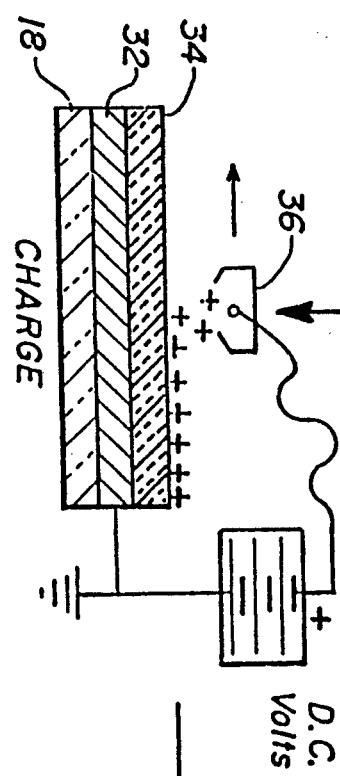
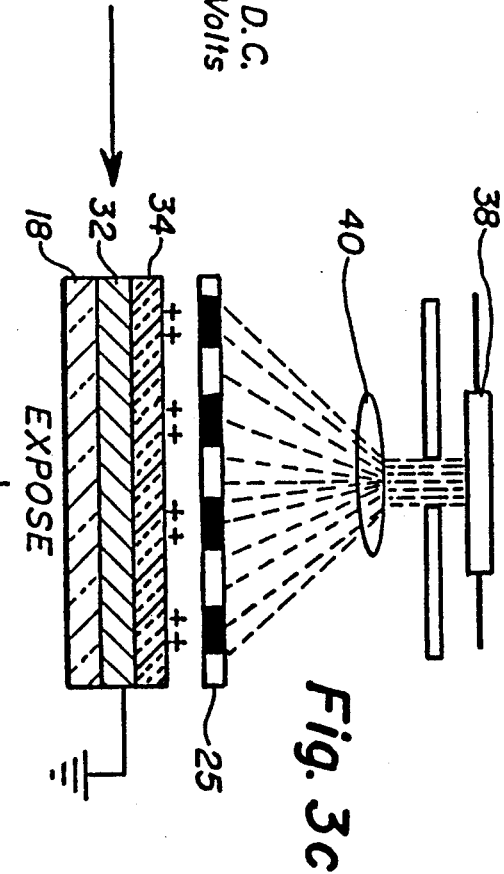
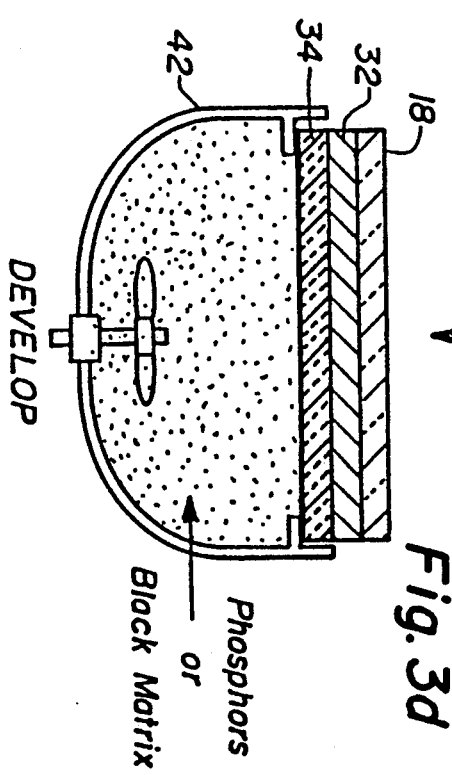
Fig. 3a DEPOSIT
Fig. 3b CHARGE
Fig. 3c EXPOSE
Fig. 3d DEVELOP
Fig. 3e FIX

SURFACE TREATMENT OF PHOSPHOR PARTICLES AND METHOD FOR A CRT SCREEN

This is a division of application Ser. No. 287,358, filed Dec. 21, 1988 pending.

The present invention relates to electrophotographically manufacturing a viewing screen for a cathode-ray tube (CRT). and more particularly to a method of surface-treating or coating dry-powdered phosphor particles with a polymer to control the triboelectric charging characteristics thereof.

BACKGROUND OF THE INVENTION

A conventional shadow-mask-type CRT comprises an evacuated envelope having therein a viewing screen comprising an array of phosphor elements of three different emission colors arranged in a cyclic order, means for producing three convergent electron beams directed towards the screen, and a color selection structure or shadow mask comprising a thin multiapertured sheet of metal precisely disposed between the screen and the beam-producing means. The apertured metal sheet shadows the screen, and the differences in convergence angles permit the transmitted portions of each beam to selectively excite phosphor elements of the desired emission color. A matrix of light-absorptive material surrounds the phosphor elements.

In one prior process for forming each array of phosphor elements on a viewing faceplate of the CRT, the inner surface of the faceplate is coated with a slurry of a photosensitive binder and phosphor particles adapted to emit light of one of the three emission colors. The slurry is dried to form a coating, and a light field is projected, from a source, through the apertures in the shadow mask and onto the dried coating so that the shadow mask functions as a photographic master. The exposed coating is subsequently developed to produce the first color-emitting phosphor elements. The process is repeated for the second and third color-emitting phosphor elements, utilizing the same shadow mask, but repositioning the light source for each exposure. Each position of the light source approximates the convergence angle of one of the electron beams which excites the respective color-emitting phosphor elements. A more complete description of this process, known as the photolithographic wet process, can be found in U.S. Pat. No. 2,625,734, issued to H. B. Law on Jan. 20, 1953.

A drawback of the above-described wet process is that it may not be capable of meeting the higher resolution demands of the next generation of entertainment devices and the even higher resolution requirements for monitors, work stations and applications requiring color alpha-numeric text. Additionally, the wet photolithographic process (including matrix processing) requires 182 major processing steps, necessitates extensive plumbing and the use of clean water, requires phosphor salvage and reclamation and utilizes large quantities of electrical energy for exposing and drying the phosphor materials.

U.S. Pat. No. 3,475,169, issued to H. G. Lange on Oct. 28, 1969, discloses a process for electrophotographically screening color cathode-ray tubes. The inner surface of the faceplate of the CRT is coated with a volatilizable conductive material and then overcoated with a layer of volatilizable photoconductive material. The photoconductive layer is then uniformly charged, selectively exposed with light through the shadow mask to establish a latent charge image, and developed using a high molecular weight carrier liquid. The carrier liquid bears, in suspension, a quantity of phosphor particles of a given emissive color that are selectively deposited onto suitably charged areas of the photoconductive layer to develop the latent image. The charging, exposing and deposition process is repeated for each of the three color-emissive phosphors, i.e., green, blue, and red, of the screen. An improvement in electrophotographic screening is described in U.S. Pat. No. 4,448,866, issued to H. G. Olieslagers et al. on May 15, 1984. In that patent, phosphor particle adhesion is said to be increased by uniformly exposing, with light, the portions of the photoconductive layer lying between adjacent portions of the deposited pattern of phosphor particles after each deposition step so as to reduce or discharge any residual charge and to permit a more uniform recharging of the photoconductor for subsequent depositions. Because the latter two patents disclose an electrophotographic process that is in essence, a wet process, many of the drawbacks described above, with respect to the wet photolithographic process of U.S Pat. No. 2,625,734, also are applicable to the wet electrophotographic process.

U.S. patent application Ser. No. 287,356, filed by P. Datta et al. on Dec. 21, 1988 now U.S. Pat. No. 4,921,767, describes an improved process for manufacturing CRT screen assemblies using triboelectrically charged dry-powdered screen structure materials and surface-treated carrier beads having a coupling agent thereon to control the polarity and magnitude of the imparted charge. Applicants have determined that, while CRT viewing screens can be electrophotographically manufactured using untreated phosphor particles, surface treatment of the phosphor particles increases the triboelectric charge on the phosphor particles, thereby causing a greater quantity of phosphor particles to be attached to each carrier bead. This improves the efficiency of the dry electrophotographic process and increases, by a factor of about 2 to 9 times, the screen weight for screens manufactured using surface-treated phosphors.

SUMMARY OF THE INVENTION

In accordance with the present invention, a method of surface-treating dry-powdered phosphor particles for use in manufacturing a viewing screen for CRT, to control the triboelectric charge characteristics of said phosphor particles, includes the steps of dissolving a sufficient quantity of a polymer in a suitable solvent to form a mixture: surface-treating the phosphor particles by adding the particles to the mixture to provide a coating of the polymer thereon and then drying the surface-treated phosphor particles. The dried, surface-treated phosphor particles have a triboelectric charge established thereon. The resultant dry-powdered surface-treated phosphor particles are used to make a luminescent viewing screen for a CRT. The polymer controls the triboelectric charge characteristics of the phosphor particles during the electrophotographic manufacturing of the screen.

BRIEF DESCRIPTION OF THE DRAWINGS

FIGS. 3a through 3e show various steps in the manufacturing of the tube shown in FIG. 1.

DETAILED DESCRIPTION OF THE PREFERRED EMBODIMENTS

Figure 1:
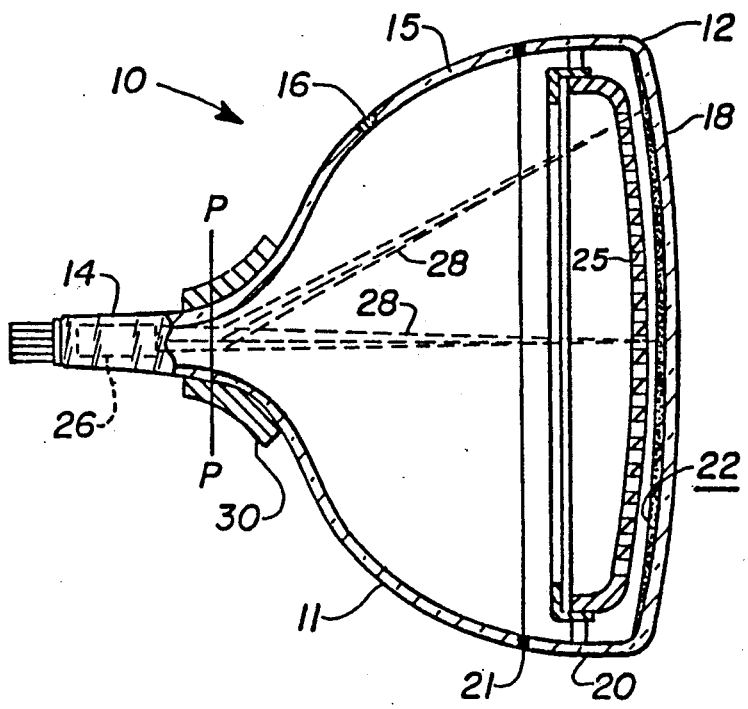
FIG. 1 is a plan view, partially in axial section of a color cathode-ray tube made according to the present invention.
Figure 2:
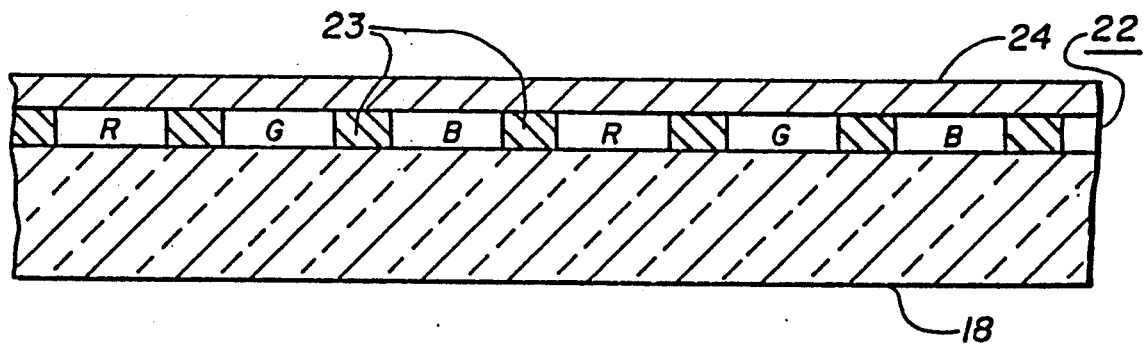
FIG. 2 is a section of a screen assembly of the tube shown in FIG. 1.

FIG. 1 shows a color CRT 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate or substrate 18 and a peripheral flange or sidewall 20, which is sealed to the funnel 15 by a glass frit 21. A three color phosphor screen 22 is carried on the inner surface of the faceplate 18. The screen 22, shown in FIG. 2, preferably is a line screen which includes a multiplicity of screen elements comprised of red-emitting, green-emitting and blue-emitting phosphor stripes R, G and B, respectively, arranged in color groups of three stripes or triads in a cyclic order and extending in a direction which is generally normal to the plane in which the electron beams are generated. In the normal viewing position for this embodiment, the phosphor stripes extend in the vertical direction. Preferably, the phosphor stripes are separated from each other by a light-absorptive matrix material 23, as is known in the art. Alternatively, the screen can be a dot screen. A thin conductive layer 24, preferably of aluminum, overlies the screen 22 and provides a means for applying a uniform potential to the screen as well as reflecting light, emitted from the phosphor elements, through the faceplate 18. The screen 22 and the overlying aluminum layer 24 comprise a screen assembly.

With respect again to FIG. 1, a multi-apertured color selection electrode or shadow mask 25 is removably mounted, by conventional means, in predetermined spaced relation to the screen assembly. An electron gun 26, shown schematically by the dashed lines in FIG. 1, is centrally mounted within the neck 14, to generate and direct three electron beams 28 along convergent paths through the apertures in the mask 25 to the screen 22. The gun 26 may, for example, comprise a bi-potential electron gun of the type described in U.S. Pat No. 4,620,133 issued to Morrell et al. on Oct. 28, 1986, or any other suitable gun.

The tube 10 is designed to be used with an external magnetic deflection yoke, such as yoke 30 located in the region of the funnel-to-neck junction. When activated the yoke 30 subjects the three beams 28 to magnetic fields which cause the beams to scan horizontally and vertically in a rectangular raster over the screen 22. The initial plane of deflection (at zero deflection) is shown by the line P—P in FIG. 1 at about the middle of the yoke 30. For simplicity, the actual curvatures of the deflection beam paths in the deflection zone are not shown.

The screen 22 is manufactured by a novel electrophotographic process that is schematically represented in FIGS. 3a through 3e and described in the above-mentioned U.S. patent application Ser. No. 287,356. Initially, the panel 12 is washed with a caustic solution, rinsed with water, etched with buffered hydrofluoric acid and rinsed once again with water, as is known in the art. The inner surface of the viewing faceplate 18 is then coated with a layer 32 of an electrically conductive material which provides an electrode for an overlying photoconductive layer 34. The conductive layer 32 is coated with the photoconductive layer 34 comprising a volatilizable organic polymeric material, a suitable photoconductive dye and a solvent. The composition and method of forming the conductive layer 32 and the photoconductive layer 34 are described in U.S. patent application Ser. No. 287,356.

The photoconductive layer 34 overlying the conductive layer 32 is charged in a dark environment by a conventional positive corona discharge apparatus 36, schematically shown in FIG. 3b, which moves across the layer 34 and charges it within the range of +200 to +700 volts, +200 to +400 volts being preferred. The shadow mask 25 is inserted in the panel 12, and the positively charged photoconductor is exposed, through the shadow mask, to the light from a xenon flash lamp 38 disposed within a conventional three-in-one lighthouse (represented by lens 40 of FIG. 3c). After each exposure, the lamp is moved to a different position, to duplicate the incident angle of the electron beams from the electron gun. Three exposures are required, from three different lamp positions, to discharge the areas of the photoconductor where the light-emitting phosphors subsequently will be deposited to form the screen. After the exposure step, the shadow mask 25 is removed from the panel 12, and the panel is moved to a first developer 42 (FIG. 3d). The developer 42 contains suitably prepared dry-powdered particles of a light-absorptive black matrix screen structure material, and surface-treated insulative carrier beads (not shown) which have a diameter of about 100 to 300 microns and which impart a triboelectrical charge to the particles of black matrix material, as described herein.

Suitable black matrix materials generally contain black pigments which are stable at a tube processing temperature of 450° C. Black pigments suitable for use in making matrix materials include: iron manganese oxide, iron cobalt oxide, zinc iron sulfide and insulating carbon black. The black matrix material is prepared by melt-blending the pigment, a polymer and a suitable charge control agent which controls the magnitude of the triboelectric charge imparted to the matrix material. The material is ground to an average particle size of about 5 microns.

The black matrix material and the surface-treated carrier beads are mixed in the developer 42, using about 1 to 2 percent by weight of black matrix material. The materials are mixed so that the finely divided matrix particles contact and are charged, e.g., negatively, by the surface-treated carrier beads. The negatively-charged matrix particles are expelled from the developer 42 and attracted to the positively-charged, unexposed area of the photoconductive layer 34 to directly develop that area. Infrared radiation is then used to fix the matrix material by melting or thermally bonding the polymer component of the matrix material to the photoconductive layer to form the matrix 23 shown in FIGS. 2 and 3e.

The photoconductive layer 34 containing the matrix 23 is uniformly recharged to a positive potential of about 200 to 400 volts, for the application of the first of three color-emissive, dry-powdered, phosphor screen structure materials. The shadow mask 25 is reinserted into the panel 12, and selective areas of the photoconductive layer 34, corresponding to the locations where green-emitting phosphor material will be deposited, are exposed to visible light from a first location within the lighthouse, to selectively discharge the exposed areas. The first light location approximates the convergence angle of the green phosphor-impinging electron beam.

The shadow mask 25 is removed from the panel 12, and the panel is moved to a second developer 42 containing suitably prepared dry-powdered particles of green-emitting phosphor screen structure material and surface-treated carrier beads. The phosphor particles are surface-treated or surface-coated with a suitable charge-controlling material as described herein. One thousand grams of surface-treated carrier beads are combined with 15 to 25 grams of surface-treated phosphor particles in the second developer 42. The carrier beads are treated to impart a, e.g., positive, charge on the phosphor particles. The positively-charged, green-emitting phosphor particles are expelled from the developer, repelled by the positively-charged areas of the photoconductive layer 34 and matrix 23, and deposited onto the discharged, light-exposed areas of the photoconductive layer in a process known as reversal developing. The deposited green-emitting phosphor particles are fixed to the photoconductive layer by exposing the surface-treated phosphor to infrared radiation which melts or thermally bonds the phosphor to the photoconductive layer.

The process of charging, exposing, developing and fixing is repeated for the dry-powdered, blue- and red-emitting, surface-treated phosphor particles of screen structure material. The exposure to visible light, to selectively discharge the positively-charged areas of the photoconductive layer 34, is made from a second and then from a third position within the lighthouse, to approximate the convergence angles of the blue phosphor- and red phosphor-impinging electron beams, respectively. The triboelectrically positively-charged, dry-powdered particles are mixed with the surface-treated carrier beads in the ratio described above and expelled from a third and than a fourth developer 42, repelled by the positively-charged areas of the previously deposited screen structure materials, and deposited on the discharged areas of the photoconductive layer 34 to provide the blue- and red-emitting phosphor elements, respectively.

The dry-powdered phosphor particles are surface-treated by coating the particles with a suitable polymer. The coating mixture is formed by dissolving about 0.5 to 5.0 and preferably about 1.0 to 2.0 weight percent of the polymer in a suitable solvent to form a coating mixture. The coating mixture may be applied to the phosphor particles by using either a rotary evaporator and fluidized dryer (examples 1–12), an adsorption method (examples 13–15) or a spray dryer (examples 16–18). The coated phosphor particles are dried, deaggregated, if necessary, sieved through a 400 mesh screen and dry milled, if required, with a flow-modifier such as a silica material sold under the trademark Cabosil (available from the Cabot Corporation, Tuscola, Ill.) or its equivalent. The concentration of flow-modifier ranges from about 0.1 to 2.0 weight percent of the surface-treated phosphor.

EXAMPLE 1

250 grams of blue phosphor particles (ZnS/Ag) are coated with a 1 weight percent coating mixture comprising 2.5 grams of a polyamide such as that sold under the trademark Unirez, 1548 (available from Union Camp Company, Savannah, Ga.), or its equivalent, and 500 ml of isopropanol. The phosphor and coating mixture is mixed in a round-bottom flask and connected to a rotary evaporator and heated to a temperature of about 85° C., under partial vacuum. Isopropanol is evaporated from the mixture and collected in a condenser with a flask. The partially dried, surface-treated phosphor is removed from the round-bottom flask and dried on a fluidized bed coater at about 70° C. for 30 minutes or until all the solvent has evaporated. The dried phosphor flakes are pulverized in a high shearing mill with a cryogenic attachment at 60° C. for 1 to 2 minutes and then screened through four 400 mesh sieves. The polymer surface-treated phosphor is dry-milled with a flow-modifier as described above.

3 grams of dry-powdered, polyamide surface-treated blue phosphor particles are mixed with about 150 grams of fluorosilane surface-treated carrier beads. The fluorosilane-treated beads are triboelectrically negative and thus induce a positive charge on the polyamide surface-treated phosphor particles. The charge-to-mass ratio and the electrophotographic screen (EPS)-characteristics (screen weight) of the phosphor manufactured by this process were tested as described herein, and the results are listed in TABLE 1.

EXAMPLE 2

Same as example 1, except that poly(ethyloxazoline), PEOX, is substituted for polyamide, and methanol is substituted for isopropanol. The drying temperature is 65° C. The test results are listed in TABLE 1.

EXAMPLE 3

Same as example 1 except that polybutyl methylmethacrylate, PBMA, is substituted for polyamide, and tetrahydrofuran, THF, is substituted for isopropanol. The drying temperature is 70° C. The test results are listed in TABLE 1. The test was repeated using aminosilane-treated beads which are triboelectrically positive and thus induce a negative charge in the surface-treated phosphor particles. The charge to mass ratio and the screen weight of the PBMA-treated phosphor are listed in TABLE 2.

EXAMPLE 4

Same as example 1, except that polyisobutyl methacrylate, MIBMA, is substituted for polyamide, and THF is substituted for isopropanol. The test results for charging with fluorosilane- and aminosilane-treated beads are listed in TABLES 1 and 2, respectively.

EXAMPLE 5

Same as example 1, except that polyvinylpyridine, PVPY, is substituted for polyamide, and chloroform is substituted for isopropanol. The drying temperature is 85° C. The test results are listed in TABLE 1.

EXAMPLE 6

Same as example 1, except that polyvinyl alcohol, PVA, is substituted for polyamide and an aqueous 10 percent, by volume, solution of isopropanol is used as the solvent. The drying temperature is 100° C. The test results for fluorosilane- and aminosilane-treated beads are listed in TABLES 1 and 2, respectively.

EXAMPLE 7

Same as example 1, except that poly (trifluorethylmethacrylate), PTFEMA, is substituted for polyamide, and freon is substituted for isopropanol. The drying temperature is 45° C. The test results are listed in TABLE 2.

EXAMPLE 8

Same as example 1, except that nitrocellulose, NCL, is substituted for polyamide, and methanol is substituted for isopropanol. The test results are listed in TABLE 2.

EXAMPLE 9

250 grams of red core phosphor particles ($Y_2O_2S/Eu$) are coated with a 1 weight percent coating mixture of polyamide and isopropanol as described in example 1. The polyamide surface-treated red phosphor was tested as described herein and the results are listed in TABLE 1.

EXAMPLE 10

Same as example 9, except that PEOX is substituted for polyamide, and methanol is substituted for isopropanol. The test results are listed in TABLE 1.

EXAMPLE 11

250 grams of green core phosphor particles (ZnS/Cu,Al) are coated with a 1 weight percent coating mixture of polyamide and isopropanol as described in example 1. The polyamide surface-treated green phosphor was tested as described herein and the results are listed in TABLE 1.

EXAMPLE 12

Same as example 11, except that PEOX is substituted for polyamide, and methanol is substituted for isopropanol. The test results are listed in TABLE 1.

EXAMPLE 13

150 grams of blue (ZnS/Ag) phosphor particles are suspended in 1 liter of deionized water and dispersed for 5 minutes at 105 volts using a premier dispersator, available from Premier Mill Co., Reading, Pa. The phosphor particles are allowed to settle and are decanted. The phosphor particles are resuspended in 1 liter of deionized water, and a freshly prepared gelatin solution is added to the phosphor suspension. The gelatin solution is prepared by swelling 0.56 gram of gelatin in 500 ml of deionized water and heating the solution to 38° C., to achieve a clear solution. The gelatin-phosphor mixture is stirred for about 30 minutes and then settled, and the liquid is decanted. The gelatin-coated phosphor particles are washed twice and then resuspended in 1 liter of deionized water. A suspension of blue pigment particles is prepared by adding 0.25 gram of cobalt aluminate to 100 ml of deionized water. The blue pigment suspension is ultrasonically dispersed for 3 minutes at 400 watts. The blue pigment suspension is added to the suspension of the gelatin-coated phosphor particles and then stirred for 30 minutes. The resultant mixture is allowed to settle, decanted, washed twice and then filtered using a Buchner funnel. The blue phosphor is dried for about 6 hours at 125° C., then dry milled for 30 minutes in a 1.5 liter jar mill half filled with 6 mm glass beads, and thereafter sieved through a 400 mesh screen.

3 grams of dry-powdered, blue pigmented gelatin surface-treated phosphor particles are mixed with about 150 grams of fluorosilane surface-treated carrier beads which are triboelectrically negative and which induce a positive charge on the gelatin coated phosphor particles. The charge-to-mass ratio and the EPS-characteristics (screen weight) of the phosphor manufactured by this process were tested as described herein, and the results are listed in TABLE 1.

EXAMPLE 14

Same as example 13, except that red ($Y_2O_2S/Eu$) phosphor particles are substituted for blue phosphor particles and the gelatin-coated phosphor is pigmented with iron oxide particles rather than cobalt aluminate. Also, the resultant dry-powdered red phosphor does not require ball-milling following the drying step. The test was conducted as described herein and the results for this gelatin-coated phosphor are listed in TABLE 1.

EXAMPLE 15

450 grams of green (ZnS/Cu,Al) phosphor particles are dry milled for 3 minutes in a 1.5 liter jar mill half filled with 6 mm glass beads and then sieved through a 400 mesh screen. The phosphor particles are then suspended in 2 liters of deionized water. A fresh gelatin solution is prepared by swelling 1.5 grams of gelatin in 1.5 liters of deionized water and heating the solution to 38° C. to achieve a clean solution. The gelatin solution is added to the phosphor suspension and stirred for about 30 minutes. The phosphor is then settled, and the liquid is decanted. The gelatin-coated phosphor is washed twice, decanted, and then dried for about 6 hours at 125° C. The dry-powdered, gelatin-coated green phosphor is sieved through a 400 mesh screen. The test was conducted as described in herein and the results are listed in TABLE 1.

EXAMPLE 16

250 grams of blue phosphor particles (ZnS/Ag) are coated with a 1 weight percent coating mixture of polyamide, or its equivalent, and THF using a spray dryer, such as a model 193, available from Brinkman Co., Westbury, N.Y. The inlet temperature of the dryer is maintained at about 70° C., and the outlet temperature varies from about 43° C. to 53° C., at a drying rate of 10 ml min. The surface-treated polymer-coated phosphor particles are screened through a 400 mesh sieve. The spray-dried phosphor coating method yields a free-flowing surface-treated phosphor material that does not require pulverization or dry-milling.

3 grams of dry-powdered polyamide surface-treated phosphor particles are mixed with about 150 grams of fluorosilane surface-treated carrier beads. The fluorosilane-treated beads are triboelectrically negative and thus induce a positive charge on the polyamide surface-treated phosphor particles. The charge-to-mass ratio and the EPS-characteristics (screen weight) of the phosphor manufactured by using a spray dryer were tested as described herein, and the results are listed in TABLE 1.

EXAMPLE 17

Same as example 16, except that red phosphor ($Y_2O_2S/Eu$) is substituted for blue phosphor. The test results are listed in TABLE 1.

EXAMPLE 18

Same as example 16, except that green phosphor (ZnS/Cu,Al) is substituted for blue phosphor. The test results are listed in TABLE 1.

TABLE 1

| Type of Phosphors | Polymer | Positive Charge-to-Mass Ratio ($\mu$C/Gm) | EPS-Characteristics Screen. Wt (mg/cm2) |
|---|---|---|---|
| blue | None | 2.2 | 0.8 |

TABLE 1-continued

| Type of Phosphors | Polymer | Positive Charge-to-Mass Ratio (μC/Gm) | EPS-Characteristics Screen. Wt (mg/cm2) |
|---|---|---|---|
| Example 1 | Polyamide | 43 | 4.5 |
| Example 2 | PEOX | 45 | 4.6 |
| Example 3 | PBMA | 28 | 4.0 |
| Example 4 | PIBMA | 24 | 3.2 |
| Example 5 | PVPY | 49 | 3.0 |
| Example 6 | PVA | 20 | 2.1 |
| Example 13 | Gelatin | 38 | 3.3 |
| Example 16 | Polyamide | 48 | 4.5 |
| red | None | 0.9 | 1.0 |
| Example 9 | Polyamide | 39 | 4.0 |
| Example 10 | PEOX | 42 | 4.2 |
| Example 14 | Gelatin | 35 | 3.0 |
| Example 17 | Polyamide | 41 | 4.2 |
| green | None | 0.2 | 0.5 |
| Example 11 | Polyamide | 35 | 4.0 |
| Example 12 | PEOX | 37 | 4.5 |
| Example 15 | Gelatin | 37 | 3.4 |
| Example 18 | Polyamide | 40 | 3.8 |

TABLE 2

| Type of Phosphors | Polymer | Negative Charge-to-Mass Ratio (μC/Gm) | EPS-Characteristics Screen. wt (mg/cm2) |
|---|---|---|---|
| blue | None | 1.5 | 0.8 |
| Example 3 | PBMA | 35 | 3.2 |
| Example 4 | PIBMA | 36 | 3.5 |
| Example 6 | PVA | 34 | 3.5 |
| Example 7 | PTFEMA | 45 | 4.2 |
| Example 8 | NCL | 44 | 4.0 |

The test results were determined using a test panel, not shown, which consists of an insulated board having a metal conductor laminated on each major surface, with a centrally disposed aperture extending through the major surfaces of the board and the conductors. Preferably, the aperture is about 2.54 cm in diameter. A metal screen of about 50 to 100 mesh extends across the aperture and is connected to one of the metal conductors. A TIC-coated glass plate extends across the aperture and is disposed on the other metal conductor so that the TIC coating is in contact therewith. For the measurement of positively-charged phosphor particles, a potential of 100 to 600 volts is applied to the conductor connected to the metal screen, with the conductor which contacts the TIC coating being grounded. The potential difference between the mesh and the glass is about $10^3$ V/cm. The test panel is located about 7.62 cm above a developer containing surface-treated phosphor particles and carrier beads as described in examples 1, 3, 13 and 16. The developer is closed at one end by a screen suitable for passing the finely divided phosphor particles, but not the carrier beads. A puff of air (velocity about $10^4$ cm/sec) separates the phosphor particles from the carrier beads and expels the charged (e.g., positively-charged) phosphor particles from the developer and towards the metal screen and TIC-coated glass plate. The resultant electrostatic charge on the TIC-coated plate is measured by an electrometer, and the mass of the phosphor particles is determined by weighing the glass plate before and after the test. The quotient of these measurements is the average triboelectric charge-to-mass ratio. The phosphor deposition area on the TIC-coated glass plate is known and controlled by the size of the aperture in the test panel. Test results are summarized in TABLES 1 and 2. The surface-treated glass beads include a coating of fluorosilane, to impart a positive charge, or aminosilane to impart a negative charge to the phosphor particles. A control was run for each color phosphor tested. The control phosphors were not surface-treated and the test results demonstrate that the surface-treated phosphors have a much higher charge-to-mass ratio than do the untreated phosphors and that the screen weights for surface-treated phosphors are substantially higher than for untreated phosphors.

While only surface-treated blue phosphor particles were tested with aminosilane-treated carrier beads to induce a negative charge on the phosphor particles, similar results would be obtained for red and green surface-treated phosphors contacted by aminosilane-treated carrier beads. The tests indicate that, for the blue surface-treated phosphor particles of examples 3, 4 and 6, the negative charge-to-mass ratios induced by the aminosilane-treated carrier beads are greater than the corresponding positive charge-to-mass ratios induced by the fluorosilane-treated carrier beads. The screen weights for the positively-charged samples of examples 3, 4 and 6 (TABLE 1) range from 2.1 to 4.0 mg/cm$^2$, whereas the same samples, when negatively charged (TABLE 2), range from 3.2 to 3.5 mg/cm$^2$. This indicates that good results may be obtained with positively or negatively charged phosphors, so that the photoconductive layer 34 may either be positively or negatively charged to utilize either direct or reversal development of the charge image. The selection of polymers for surface-coating the phosphors and the surface-coating on the carrier beads depends upon the type of development desired and the screen weight required. The surface-treated phosphor materials described herein are all satisfactory for screen manufacturing and thus allow for such considerations as materials cost and ease of surface treatment.

What is claimed is:

1. A CRT comprising an electrophotographically manufactured luminescent viewing screen and means for selectively exciting areas of said screen to luminescence, said screen comprising picture elements of color-emitting phosphors arranged in color groups, each element of a color group comprising dry-powdered phosphor particles emissive to light in a particular portion of the visible spectrum, said dry-powdered phosphor particles being coated with a surface charge-controlling polymeric material to control the triboelectric charge characteristics of said phosphor particles during the manufacturing of said screen, said polymeric material being selected from the group consisting of gelatin, poly(ethyloxazoline), polyamide, polyvinylpyridine, polybutylmethylmethacrylate, polyvinyl alcohol, polyisobutylmethacrylate, poly (trifluorethyl methacrylate), and nitrocellulose.

2. The CRT described in claim 1 wherein said color-emitting phosphors in each of the color groups being separated from each other by a light-absorbing matrix material.

3. The CRT described in claim 2 wherein said color-emitting phosphors being red-emitting, green-emitting and blue-emitting.

4. A CRT comprising an electrophotographically manufactured luminescent viewing screen and means for selectively exciting areas of said screen to luminescence, said screen comprising picture elements of color-emitting phosphor stripes arranged in color groups of three stripes in cyclic order, each stripe of a color group comprising dry-powdered phosphor particles emissive to light in a particular portion of the visible spectrum, said dry-powdered phosphor particles being coated with a surface charge-controlling polymeric material to control the triboelectric charge characteristics of said phosphor particles during the manufacturing of said screen, said polymeric material being selected from the group consisting of gelatin, poly(ethyloxazoline), polyamide, polyvinylpyridine, polybutylmethylmethacrylate, polyvinyl alcohol, polyisobutylmethacrylate, poly(trifluorethylmethacrylate), and nitrocellulose.

5. The CRT described in claim 4 wherein said color-emitting phosphor stripes in each of the color groups being separated from each other by a light-absorptive matrix material.

6. The CRT described in claim 4 wherein said color-emitting phosphor stripes being red-emitting, green-emitting and blue-emitting.

* * * * *

UNITED STATES PATENT AND TRADEMARK OFFICE
CERTIFICATE OF CORRECTION

PATENT NO. : 5,012,155

DATED : April 30, 1991

INVENTOR(S) : Pabitra Datta et al.

It is certified that error appears in the above-identified patent and that said Letters Patent is hereby corrected as shown below:

Col. 1, line 54, change "AdditionallY" to --Additionally--.

Col. 2, line 20, after "is" add --,--.

Col. 2, line 47, before "CRT" add --a--.

Col. 3, line 16, change "Which" to --which--.

Col. 5, line 35, change "than" to --then--.

Signed and Sealed this

Twenty-second Day of September, 1992

Attest:

DOUGLAS B. COMER

Attesting Officer     Acting Commissioner of Patents and Trademarks